(12) United States Patent
Gomez

(10) Patent No.: US 9,781,538 B2
(45) Date of Patent: Oct. 3, 2017

(54) MULTIUSER, GEOFIXED ACOUSTIC SIMULATIONS

(71) Applicant: Raytheon BBN Technologies Corporation, Cambridge, MA (US)

(72) Inventor: Teresa M. Gomez, Alexandria, VA (US)

(73) Assignee: Raytheon BBN Technologies Corporation, Cambridge, MA (US)

( * ) Notice: Subject to any disclaimer, the term of this patent is extended or adjusted under 35 U.S.C. 154(b) by 0 days.

(21) Appl. No.: 15/297,414

(22) Filed: Oct. 19, 2016

(65) Prior Publication Data

US 2017/0041731 A1 Feb. 9, 2017

Related U.S. Application Data

(62) Division of application No. 14/592,158, filed on Jan. 8, 2015.

(51) Int. Cl.
*H04S 7/00* (2006.01)
*H04S 1/00* (2006.01)
*H04S 5/00* (2006.01)
*G06F 3/16* (2006.01)

(52) U.S. Cl.
CPC .............. *H04S 7/304* (2013.01); *H04S 1/007* (2013.01); *H04S 5/00* (2013.01); *G06F 3/165* (2013.01); *H04S 7/40* (2013.01); *H04S 2420/01* (2013.01)

(58) Field of Classification Search
CPC . H04S 7/304; H04S 1/007; H04S 7/40; H04S 5/00; H04S 2420/01; G06F 3/165

USPC ..................................................... 381/17, 310
See application file for complete search history.

(56) References Cited

U.S. PATENT DOCUMENTS

2003/0227476 A1   12/2003   Wilcock et al.
2012/0093320 A1   4/2012   Flaks et al.
2016/0119737 A1   4/2016   Mehnert et al.
2016/0205488 A1   7/2016   Gomez

OTHER PUBLICATIONS

Notice of Allowance dated Apr. 27, 2017 for U.S. Appl. No. 14/592,158; 11 Pages.
Response to U.S. Non-Final Office Action dated Jan. 27, 2017 for U.S. Appl. No. 14/592,158; Response filed on Mar. 29, 2017; 8 Pages.
U.S. Non-Final Office Action dated Jan. 27, 2017 for U.S. Appl. No. 14/592,158; 12 Pages.
U.S. Restriction Requirement dated Sep. 22, 2016 corresponding to U.S. Appl. No. 14/592,158; 6 Pages.
Response to U.S. Restriction Requirement dated Sep. 22, 2016 corresponding to U.S. Appl. No. 14/592,158; Response filed Oct. 17, 2016; 1 Page.

*Primary Examiner* — David Ton
(74) *Attorney, Agent, or Firm* — Daly, Crowley, Mofford & Durkee, LLP

(57) ABSTRACT

A system for multiuser, geofixed acoustic simulations using a shared soundscape built and stored on a central server, via interfaces that also allow for live and competitive modification. A central server disseminates sound events from the soundscape to individual devices carried by users, which integrate geolocation information, head orientation information, and head-related transfer functions (HRTFs) to generate user-specific audio feeds. The audio feeds may be played through headsets so that users perceive the shared, geofixed sound events.

13 Claims, 6 Drawing Sheets

MULTIUSER, GEOFIXED ACOUSTIC SIMULATIONS

CROSS REFERENCE TO RELATED APPLICATION

This application is a divisional of co-pending U.S. application Ser. No. 14/592,158 filed Jan. 8, 2015, which is incorporated by reference herein in its entirety.

BACKGROUND

It is known to provide multiple users with a shared audio experience, such as a simulation wherein multiple usersh hear the same sounds at substantially the same time. For example, virtual reality systems, video games, training exercises, and other simulations may make use of shared audio experiences.

As is also known, a head-related transfer function (HRTF) is a response that characterizes how an ear receives sound from a point in space. A pair of HRTFs for two ears can be used to synthesize a binaural sound that seems to come from a particular point in space. Commercially available products that are known to use HRTFs include computer software to simulate surround sound playback from loudspeakers.

SUMMARY

It is appreciated herein that it would be desirable to provide a multiuser, shared audio experience in which sound events are associated with real-world geographic locations. Such an audio experience may be hosted centrally and disseminated to an arbitrary number of users using processing techniques that adaptively generate individual audio feeds based on users' geographic coordinates and head orientation. As users navigate through the physical world, the individualized audio feeds give the perception that the shared sound events are fixed to geographic, potentially changing locations. The shared audio experience may be extended to cover generally any geographic area.

In accordance with one aspect of the disclosure, a device for geofixed acoustic simulations comprises: a head orientation module configured to provide information about the orientation of a user's head; and a sound event processor operatively coupled to the head orientation module. The sound event processor may be configured to receive a waveform and location/timing information associated with a sound event; level-adjust the waveform based upon a distance between a geographic location associated with the device and a geographic location associated with the sound event; apply a left-ear head-related transfer function (HRTF) to the waveform using the head orientation information to generate a left audio feed; and apply a right-ear HRTF to the waveform using the head orientation information to generate a right audio feed.

In some embodiments, the device further comprises plurality of speakers operatively coupled to receive audio feeds from the sound event processor. In certain embodiments, the device further comprises a location module operatively coupled to the sound event processor and configured to provide a geographic location associated with the device. In various embodiments, the sound event processor is further configured to time-adjust a waveform associated with a sound event based upon a distance between a geographic location associated with the device and a geographic location associated with the sound event. In certain embodiments, the location/timing information comprises a geographic location and a corresponding time value. In particular embodiments, the location/timing information comprises a vector of geographic locations and corresponding time values.

In some embodiments, the device further comprises a memory. The sound event processor may be further configured to record a geographic location associated with the device and/or head orientation information to the memory. The memory may be configured to store feature maps, wherein the sound event processor is further configured to adjust the waveform based upon information within the feature maps.

In accordance with another aspect of the disclosure, a system for multiuser, geofixed acoustic simulations comprises a central server including a memory configured to store a soundscape profile defining a plurality of sound events, each of the plurality of sound events having an associated waveform, location/timing information, and trigger criteria; a soundscape controller operatively coupled to the soundscape profile and configured to select ones of the plurality of sound events based upon the trigger criteria; and a wireless transmitter operatively coupled to the soundscape controller to transmit information about selected sound events. The system further comprises a plurality of user devices, each of the user devices including: a head orientation module configured to provide information about the orientation of a user's head; a wireless receiver configured to receive information about sound events transmitted from the central server; and a sound event processor operatively coupled to the head orientation module. Each of the sound event processors may be configured to: receive, using the wireless receiver, a waveform and a geographic location associated with a sound event; level-adjust the waveform based upon a distance between a geographic location associated with the device and the geographic location associated with the sound event; apply a left-ear head-related transfer function (HRTF) to the received waveform to generate a left audio feed; and apply a right-ear HRTF to the received waveform to generate a right audio feed. At least one of the user devices may correspond to the device described above, including various embodiments thereof.

In some embodiments of the system, the central server further comprises an interface to enable an operator to build a soundscape profile. The interface may comprise a digital map tool to enable the operator to associate ones of a plurality of sound events with corresponding geographic locations. The memory may be further configured to store sound libraries, wherein the interface comprises a browser to enable the operator to select waveforms from the sound libraries to associate with ones of a plurality of sound events. The interface may enable the operator to associate timing information and/or trigger criteria to ones of a plurality of sound events.

In certain embodiments of the system, the central server comprises a wireless receiver and a user tracking module, wherein the user tracking module is configured to receive geographic locations associated with ones of the plurality of user devices using the wireless receiver.

In accordance with yet another aspect of the disclosure, a method comprises: providing a soundscape profile defining a plurality of sound events, each of the sound events having an associated waveform and geographic location; receiving a waveform and a geographic location associated with a sound event; obtaining information about the orientation of a user's head; obtaining a geographic location associated with the user; level-adjusting and time-delaying the waveform based upon a distance between the geographic location associated with the user and the geographic location associated with the sound event; applying a left-ear heard-related transfer function (HRTF) to the waveform to generate a left audio feed; and applying a right HRTF to the waveform to generate a right-ear audio feeds.

BRIEF DESCRIPTION OF THE DRAWINGS

The disclosure may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. As used herein, the term "sound event" is used to describe a segment of an audio signal associated with a given time (or range of times) and a given location (or range of locations). One or more sound events may be combined to form a so-called "soundscape." As used herein, the term "geographically fixed" (or "geofixed") refers to the association of an event with a specific geographic location at a given point in time. Thus, a geofixed sound event refers to a sound event associated with a specific geographic location at a given point in time. It should be understood that the location of a geofixed sound event may vary over time. A soundscape may be provided from one or more geofixed sound events. The term "real-time" refers to the actual time during which a process takes place or an event occurs. As used herein, if a process or event is perceived by a person or user of a system with a relatively small or imperceptible delay, the process or event is considered to be perceived in real-time. Thus, data communication and/or data processing events that occur with a delay that is generally imperceptible to users are considered to be real-time events.

Figure 1:
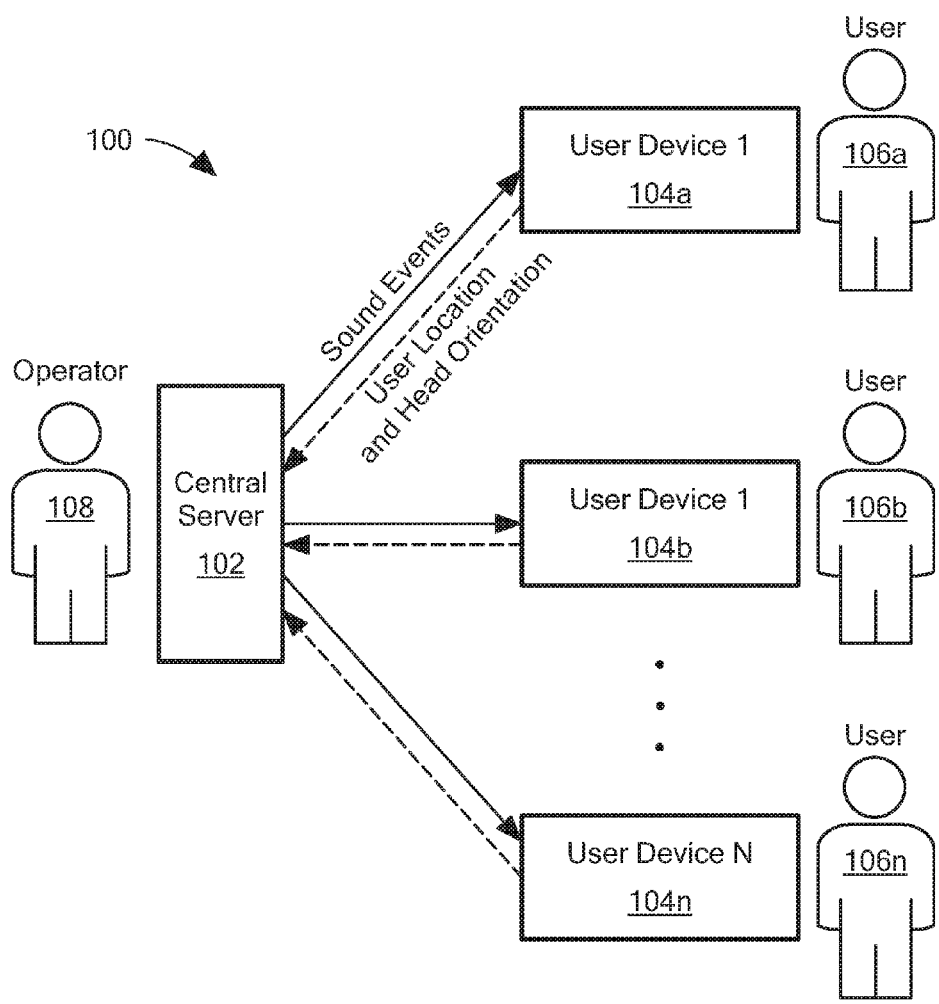
FIG. 1 is a block diagram of a multiuser acoustic simulation system.

Referring to FIG. 1, a multiuser acoustic simulation system 100 comprises a central server 102 in wireless communication with one or more user devices 104. A user device 104 may be worn by, carried by, or otherwise disposed in proximate relation to a corresponding user 106, as shown. The example of FIG. 1 includes three users 106a, 106b, and 106n and three corresponding user devices 104a, 104b, and 104n, respectively. It will be appreciated that a multiuser acoustic simulation system 100 may include generally any number of users 106 and user devices 104. The particular number of users 104 (and thus devices 106) will depend upon the particular application. In some applications only a single user may exist while in other applications, thousands of users may exist.

The system 100 provides multiuser, acoustic simulations by hosting and disseminating one or more custom geofixed soundscapes to the users 106. More specifically, an operator 108 can use various interfaces to build and modify soundscapes hosted within the central server 102. In some embodiments, during simulation, the central server 102 selects sound events from hosted soundscapes and transmits those sound events to user devices 104. Audio equipment at a user device 104 converts the received sound events into a multi-channel audio signal (e.g., left and right audio signals) for playing through an electro acoustic device (e.g., loud speaker, stereo headphones, a bone conduction headset, or any other device capable of converting a signal (e.g., an electrical signal) into an audio signal) so as to be heard by a user 106. It should be appreciated that the "audio" equipment could include a vibration device to simulate pressure waves traveling to a body part other than the ear. User-specific waveform processing techniques may typically be applied so that the sound events are perceived by the user 106 to be geofixed, meaning they originate from specific geographic locations ("geolocations") defined within the soundscape. User-specific waveform processing can be performed at the central server 102, at the user devices 104, or apportioned therebetween. In various embodiments, the multi-channel audio feed is adapted based upon the user's geolocation and/or head orientation. In some embodiments, user devices 104 transmit geolocation and/or head orientation information to the central server 102.

Figure 2:
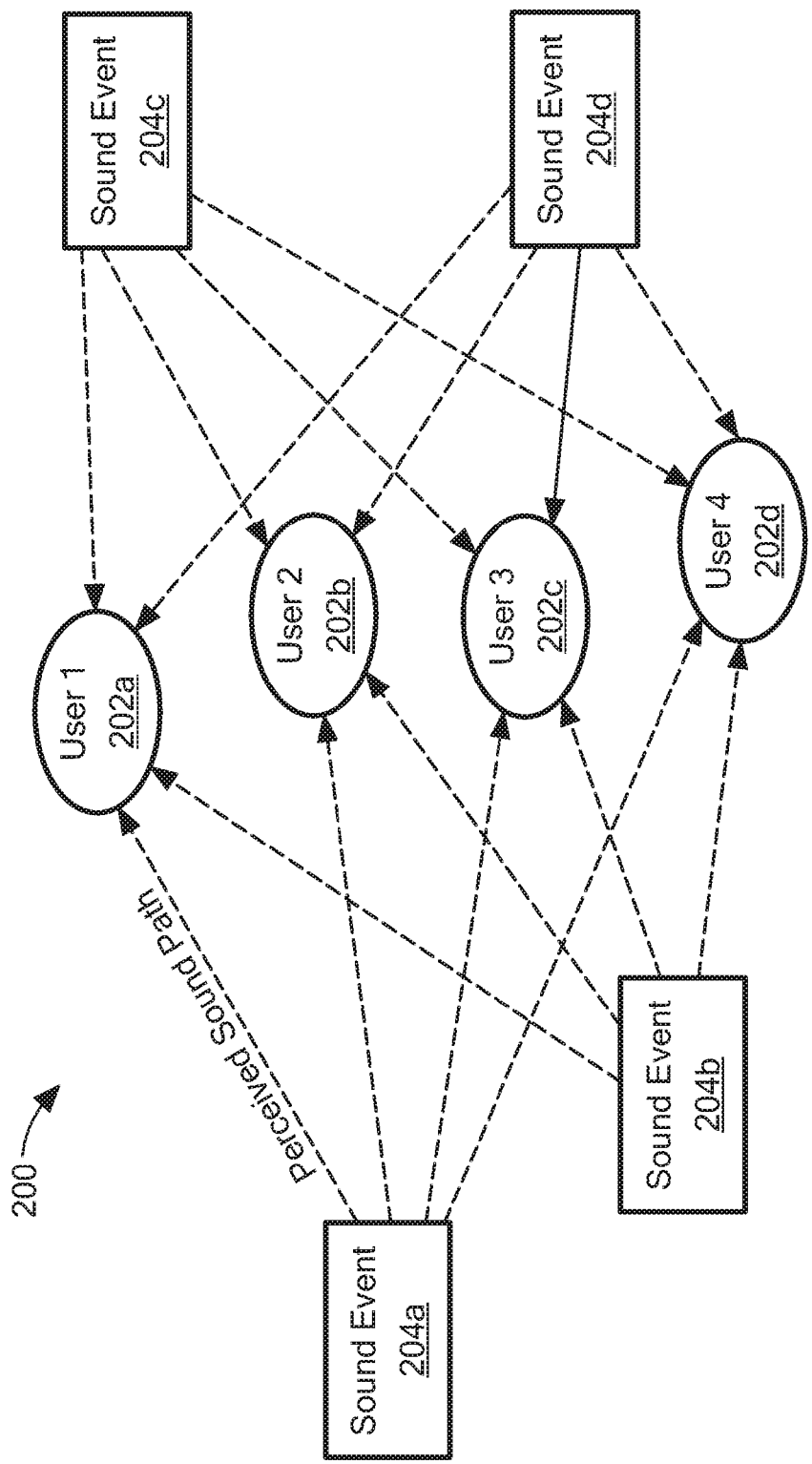
FIG. 2 is a block diagram representation of an acoustic simulation that may be produced by the system of FIG. 1.

Referring to FIG. 2, a multiuser, acoustic simulation 200 may be produced by a system operating in accordance with the concepts, systems and techniques described herein such as the system 100 of FIG. 1. A simulation 200 includes and one or more users 202, here four users 202a-202d, to perceive one or more geofixed sound events 204, here four sound events 204a-204d. It will be appreciated that the systems and techniques described herein can be used to produce simulations 200 involving generally any number of users 202 and sound events 204.

The sound events 204 are geofixed, meaning that at any specific instant in time, each sound event is associated with specific geolocations defined within an acoustic simulation system 100 (FIG. 1). It should, of course, be appreciated that the specific location of a sound event may change over time. Any suitable representation can be used to define the location of sound events, including both two- and three-dimensional representations. In various embodiments, sound event geolocations are represented as latitude and longitude (and also, in some embodiments, altitude). It should be understood that, in general, a physical sound wave does not originate from a geolocation associated with a sound event 204, but rather the sound events 204 are simulated such that they are perceived by users as originating from such geolocations.

Users 202 can move freely about, including within and outside the geographic region in which the sound events 204 exist. Notwithstanding limitations on the wireless connectivity between a central server 102 and a user device 104, a user 202 perceives the sound events 204 as originating from their respective geolocations, traveling along a perceived sound path. To achieve this, the central server 102 and/or user device 104 generates a multi-channel, adaptive sound feed using the relative geolocation of the user 202 and sound event 204, and the orientation of the user's head. User location and head orientation may be measured and applied in real-time. As a user 202 moves around the physical world and/or changes head orientation, the user perceives the sound event 204 to be geofixed (i.e. the user perceives one or more sounds as originating from one or more geographic locations). In some embodiments, a user's 202 latitude and longitude is determined using any suitable means (e.g., a Global Positioning System (GPS) receiver) and used to calculate a relative location of a sound event 204 (using the defined geolocation associated with the sound event).

Figure 3A:
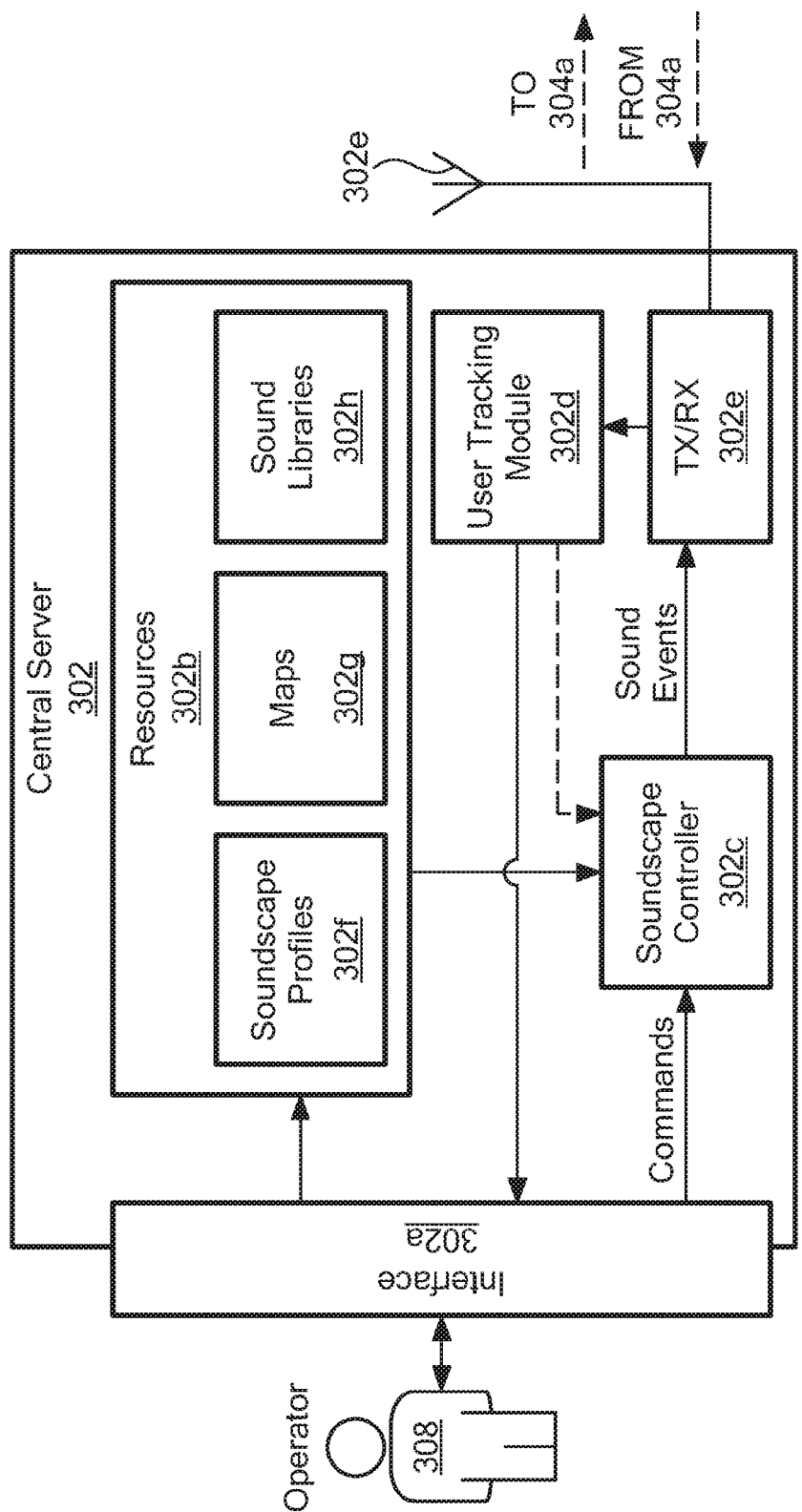
FIG. 3A is a block diagram of an illustrative central server for use within a multiuser acoustic simulation system.

Referring to FIG. 3A, an illustrative central server 302 may be the same as or similar to the central server 102 of FIG. 1. The central server (sometimes referred to as a "central control system") 302 includes any suitable combination of hardware and/or software to host and disseminate soundscapes to user devices. In this example, the central sever 302 includes a storage device (e.g. a memory) having resources 302b stored therein, a soundscape controller 302c, and a wireless transmitter 302e, coupled as shown. In various embodiments, the central server 302 includes (or forms a portion of) a computer or other processing device, such as the illustrative computer 500 shown in FIG. 5 and described below in conjunction therewith.

The resources 302b include any data and/or processing resources that may be used by the soundscape controller 302c. In this example, the resources 302b include digital files or digital information corresponding to soundscape profiles 302f, maps 302g, and sound libraries 302h.

A soundscape profile 302f is a description of a time-varying soundscape, which can be used within a simulation. In general, a soundscape profile 302f contains data that defines an arbitrary number of simulated, geofixed sound events and corresponding location and trigger parameters. In one embodiment, soundscape profiles 302f are provided as one or more data files.

In a particular embodiment, a soundscape profile includes the following information for a sound event: a waveform identifier (i.e., a value identifying a waveform within the sound libraries 302h), location/timing information, and trigger criteria. For stationary sound events, the location/timing information may correspond to a single geolocation (e.g., coordinates) and a corresponding time value. For moving sound events, the location/timing information may correspond to trajectory vectors having a plurality of geolocations and corresponding time values to indicate the location of the event at different points in time. Such time values may be relative to the starting time (or "execution time") of the event. The trigger criteria specify the conditions necessary for the sound event to be played (or "executed"). For example, trigger criteria may specify that a sound event should be played a predetermined time or immediately (such as when the operator 308 dynamically adds a sound event during a simulation). As another example, trigger criteria may be based upon user location, movement, or other any other available user information (e.g., "play sound when any user is within N meters of specific geolocation").

The maps 302g include digital representations of maps that can be used to build, modify, and simulate soundscapes. In some embodiments, the maps 302g are provided as data files. The maps 302 may include geographic maps provided for use within a digital map interface tool and feature maps used for site-specific enhancements, which describe environmental features relevant to sound propagation, e.g. vegetation density, walls, topography. The geographic maps may be provided using open source geographic map tiles known in the art. The feature maps may be provided as vectors of coordinates and corresponding property values (e.g., density, reflectiveness).

The sound libraries 302h may include segments of audio, referred to herein as "waveforms," for use within the system 100 (FIG. 1). The waveforms may be encoded and stored in a digital format, such as Waveform Audio File Format ("WAV") or any other suitable format. In certain embodiments, a soundscape profile 302f references waveforms within the sound libraries 302h. More particularly, sound events defined within a soundscape profile 302f are associated with respective waveforms included with sound libraries 302h.

The resources 302b may be stored within a suitable memory device, such as a non-volatile memory device, a disk drive, a Flash memory device, a database, etc. In various embodiments, the resources 302b are provided as directories and/or files within a computer file system. For example, a sound library 302h may correspond to a directory and the library waveforms may correspond to files therein.

The wireless transmitter 302e is used to transmit sound events to user devices 104. The wireless transmitter 302e may comprise a radio frequency (RF) transmitter, an 802.11 transceiver, an optical transmitter, an ultrasonic communication device, or any other suitable wireless communication device. A conventional wireless transmitter operating in accordance with known communication techniques may be used. The communication technique used within the system 100 (FIG. 1) may be selected based upon requirements for a given simulation, such as the maximum distance between user devices 104 (FIG. 1) and a central server 302, bandwidth required to transmit sound events (which can be determined based upon the frequency content thereof), maximum tolerable propagation delay, etc. In some embodiments, the central server 302 also receives user location and/or head orientation information transmitted from user devices 104 and, therefore, the wireless transmitter 302e may be provided as a transmit-receive device, such as a transmit-receive module or a transceiver.

In some embodiments, the wireless transmitter 302e corresponds to a wireless access point, router, or the like, operatively coupled to the central server 302 via any suitable network or communication path.

In various embodiments, an interface 302a is provided within, or in combination with, the central server 302. An operator 308 can use the interface 302a to access the central server 302 to build (i.e., prepare) new simulations, to track and modify ongoing (or "live") simulations, and to analyze completed simulations. More particularly, the interface 302a may include a graphical user interface (GUI) which the operator 308 can use to browse and select audio clips from the sound libraries 302h, to assign geographic coordinates and/or trajectory vectors to selected audio clips, to configure the trigger and duration parameters for the selected audio clips, and to save this information to a soundscape profile 302f. In some embodiments, the interface 302a includes a digital map tool that uses map resources 302g to aid the operator in associating sound events with geographic coordinates and/or defining trajectories for sound events. The interface can also be used to modify existing soundscape profiles 302f, to merge soundscape profiles together, and to share soundscape profiles with other operators 308 and/or other acoustic simulation systems. A soundscape profile 302f may be generated with the assistance of automation algorithms that, for example, replicate a sound event several times with randomized timing and location parameters. Sound events may be associated with user 106 locations, so that a sound event may be perceived by a user as following a user, or respond to a particular user's motion, or be triggered only under certain circumstances.

In addition, an operator 308 can use the interface 302a to dynamically alter an ongoing simulation. More particularly, the operator would issue commands through the interface 302a, which the soundscape controller 302c would fuse with information within a soundscape profile 302f and alter an ongoing simulation.

The interface 302a may be provided from any computational device with display and input mechanisms, such as a computer, tablet, smartphone, or any mobile processing device capable of communicating with one or more components of the central server 302. The interface 302a can also include a sensor used to trigger sound events in real-time, such as a microphone to receive voice commands, an instrumented glove to receive motion-based commands (e.g., throwing motions), other instrumented apparel, etc. The interface 302a may be in wireless communication with the central server 102, thus allowing the operator 308 to participate in a simulation. In some embodiments, the interface 302a comprises (or forms a portion of) a user device 104 (FIG. 1).

Multiple interfaces 302a may be provided to dictate sound events to the central server 302 for collaboration or competition purposes. Competing interfaces 302a may have features enabling one operator to block another operator's ability to implement certain types of sound events. The presence of these features may be automatically controlled by criteria such as user location; for instance, by assigning users to teams where one leader or all members of each team possess an interface 302a (e.g., a mobile device), and using the physical movements of these teams to grant or remove abilities.

In certain embodiments, the central server 302 includes a user tracking module 302d to track information about users 106 participating in a simulation. For example, the user devices 104 (FIG. 1) may transmit user location and/or head orientation data to the central server 302, which the user tracking module 302d would receive and store. Such user data may be used in various ways. For example, the soundscape controller 302c can apply user location data to criteria within a soundscape profile 302f to trigger sound events. As another example, an operator 308 may use the interface 302a to view the location of users 106 (overlaid on a map 302g) in real-time and dynamically vary the simulated soundscape in response to user behavior.

The soundscape controller 302c comprises any suitable combination of hardware and/or software to disseminate custom soundscapes to the user devices 104 through the transmitter 302e according to soundscape profiles 302f and other resources 302b in addition to commands received from the operator 308. In various embodiments, the soundscape controller 302c includes (or forms a portion of) a computer or other processing device, such as the illustrative computer 500 shown in FIG. 5 and described below.

In a particular embodiment, the soundscape controller 302c maintains a queue of sound events, organized by time. An entry in the queue may include the following information: a waveform identifier; a geolocation associated with the sound event; and an execution time. In some embodiments, the soundscape controller 302c maintains a separate queue implementation for each user wherein the contents of a queue may depend on the corresponding user's location or other state information. A queue can be shared in its entirety with user devices (i.e., preloaded on user devices), provided on a per-event basis (i.e., "streamed"), or used exclusively on the central server 302 in embodiments where the central server generates "final" audio feeds.

The soundscape controller 302c adds entries to the queue based upon trigger criteria within a soundscape profile 302f. For example, if a soundscape profile 302f includes a sound event having trigger criteria "play sound when any user is within N meters of specific geolocation," the soundscape controller 302c adds a corresponding entry to the queue when it determines any user is within N meters of the specified location. To determine this, the soundscape controller 302c can use user location information from the user tracking module 302d. It should be understood that a single entry in the soundscape controller 302c may result in multiple entries in the queue (i.e., trigger criteria may specify that a sound event can be repeated) or none. Queue entries can also be added in response to commands issued by the operator 308. The controller fuses previous and new soundscape profile information, and possibly user location history, to modify the queue accordingly as needed.

In some embodiments, transmitted sound events are not tailored to specific users and thus, the central server 302 may use a suitable broadcasting/multicasting technique, such as Internet Protocol (IP) multicast. In other embodiments, the central server 302 generates sound events that are tailored to specific users which are then transmitted to the users via transmitter 302e. For example, the soundscape controller 302c may use user location data available within the user tracking module 302d to select sound events in proximity to a given user and transmit those sound events through the transmitter 302e. As another example, the soundscape controller 302c may apply certain user-specific waveform processing techniques before sound event data is transmitted. Such processing techniques are described further below in conjunction with FIG. 4. Thus, in cases where sound events are tailored to specific users, the sound events may be transmitted to those specific users. In this embodiment, the soundscape controller 302c may use any suitable unicast technique, such as point-to-point (P2P) or IP unicast. Alternatively, sound events may be "coded" for a specific user but transmitted to multiple users or all users (e.g., using a broadcast or multicast technique) and the sound event may be decoded only by the intended user. As another alternative, the sound event may be coded such that it is filtered (or otherwise blocked) by all users except for the intended user.

Figure 3B:
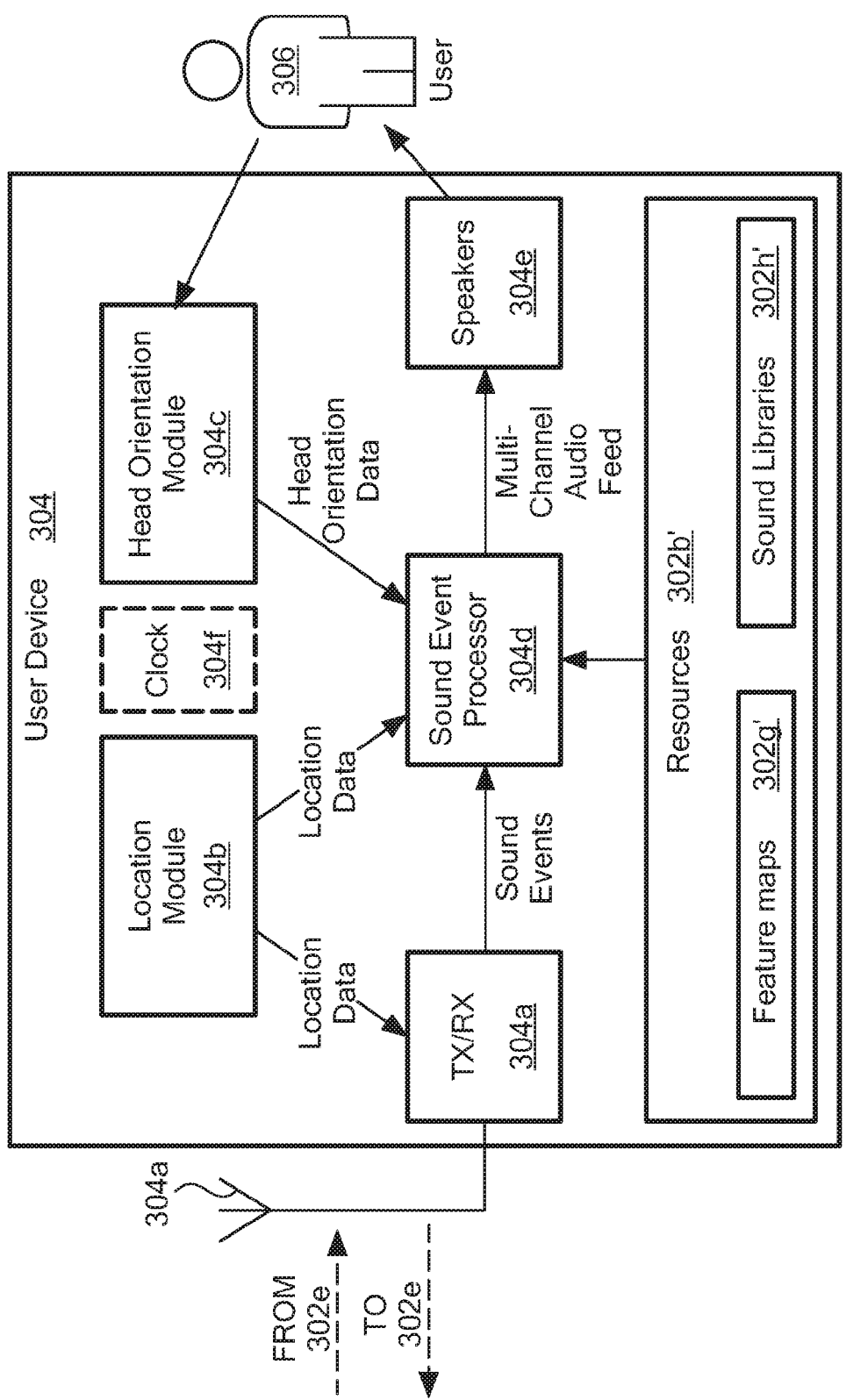
FIG. 3B is a block diagram of an illustrative user device for use within a multiuser acoustic simulation system.

Referring to FIG. 3B, a user device 304 may be the same as or similar to any of the user devices 104 of FIG. 1. The illustrative user device 304 includes a wireless receiver 304a, a location module 304b, a head orientation module 304c, a sound event processor 304d, and speakers 304e, operatively coupled as shown. A user device 304 may be worn by, carried by, or otherwise disposed in proximate relation to a respective user 306. In various embodiments, the user device 304 includes (or forms a portion of) a computer or other processing device, such as the illustrative computer 500 shown in FIG. 5 and described below.

The wireless receiver 304a is used to receive sound events from the central server 102. Accordingly, the wireless receiver 304a may correspond to a conventional wireless receiver operating in accordance with known communications techniques, such as the techniques described above in conjunction with the wireless transmitter 302e of FIG. 3A. In some embodiments, the user device 304 also transmits user location and/or head orientation information to the central server 102 and, therefore, the wireless receiver 304a may be provided as a transmit-receive device, such as a transmit-receive module or a transceiver.

In various embodiments, the location module 304b comprises a conventional GPS receiver that provides relatively coarse location data. For simulations that require relatively precise location of sound events, more accurate location data can be obtained using suitable techniques known in the art. For example, a time difference of arrival (TDOA) processing technique can be used wherein emitters and receivers are mounted on users 306 to obtain precise relative location data that can be fused with coarse absolute location data from user-mounted GPS, or emitters or receivers mounted on fixed, carefully surveyed locations. These methods become important for indoor, underground, or cramped locations. A GPS module may also provide precise timing information that can be used to synchronize units.

In certain embodiments, the location module 304b can be omitted from a user device 304, such as when the user's location can be obtained from an external source.

The head orientation module 304c comprises any suitable combination of hardware and/or software to determine a user's head orientation. In certain embodiments, the head orientation module 304c comprises a device worn on the head of the user 306, such as a helmet or a virtual reality (VR) headset. In various embodiments, the head orientation module 304c includes a magnetometer, a gyroscope, and/or an accelerometer which can be used in any suitable combination to obtain accurate head orientation. In some embodiments, the head orientation module 304c comprises an inertial measurement unit (IMU) corresponding to an accelerometer/gyroscope/magnetometer.

The speakers 304e may correspond to any suitable device that receives signals (e.g., electrical or optical signals) corresponding to multi-channel audio signals and converts the received signals into corresponding sound waves. The speakers 304e may be provided, for example, as one or more of a loudspeaker, headphones, in-ear speakers ("earbuds"), a bone conduction headset, or the like. In certain embodiments, the speakers 304e and head orientation module 304c are integrated into a single apparatus worn by the user 306. For example, in military training exercises, these components may be integrated into a helmet. In some embodiments, the speakers 304e and/or head orientation module 304c are provided within a commercial off-the-shelf (COTS) VR headset.

The sound event processor 304d comprises any suitable combination of hardware and/or software to receive sound events via the wireless receiver 304a, to generate audio feeds based upon the received sound events, and to play the audio feeds via the speakers 304e. To generate the audio feeds, the sound event processor 304d uses sensor data (e.g., data obtained using the location module 304b and/or head orientation module 304c) and waveform processing techniques applied to the sound event waveforms. In some embodiments, the sound event processor 304d maintains a queue of pending sound events, dynamically moving sound events in and out of the queue based upon trigger criteria associated with each sound event. Sound event timing information may be set by the operator as time values relative to the start of the sound event and an absolute time value is assigned to the sound event when it as added to the queue (according to the trigger criteria). Such a queue is described further above in conjunction with the soundscape controller 302c of FIG. 3A. In various embodiments, sound event processor 304d provides at least a portion of the processing shown in FIG. 4 and described below. In some embodiments, sound event processor 304d includes (or forms a portion of) a computer or other processing device, such as the illustrative computer 500 shown in FIG. 5 and described below.

In various embodiments, a user device 304 includes resources 302b' which include some or all of the resources 302 provided within central server 302. For example, to avoid transmitting relatively large waveform files, sound libraries 302W (which may be the same as or similar to the libraries 302h of FIG. 3A) may be provided. Likewise, feature maps 302g' may be stored upon a user device 304, which may correspond to a portion of the maps 302g of FIG. 3A.

In some embodiments, a distributed acoustic simulation system 100 (FIG. 1) is capable of operating when connectivity is lost between user devices 104 and the central server 102. Although live tracking and modification of the soundscape will not be possible when connectivity is lost, sound events already transmitted to user devices could still be simulated. For example, a user device could maintain a queue of pending sound events. Processing, even in a simplified form with respect to site-specific enhancements, could automatically switch to such a "local" operation upon detection of a loss in connectivity, and revert to the normal (i.e., centralized) operation upon restoration of the connection.

In certain embodiments, the user device 304 comprises a clock 304f used to synchronize sound events. Precise timing information obtained from a GPS module 304b can be used to synchronize clocks across user devices.

In an alternative embodiment, the user devices 304 can operate without a central server 102. Here, the sound libraries 302h, soundscape profile 302f, and other required resource information described above in conjunction with FIG. 3A would be stored (or "pre-loaded") upon the user devices 304. The sound event processor 304d can use this information to perform any of the soundscape processing that would otherwise be performed by the soundscape controller 302c, as described above. The clocks 304f can be used to synchronize user devices 304 in a decentralized manner. Such a decentralized configuration may be preferable during simulations where wireless connectivity is expected to be poor or nonexistent.

Figure 4:
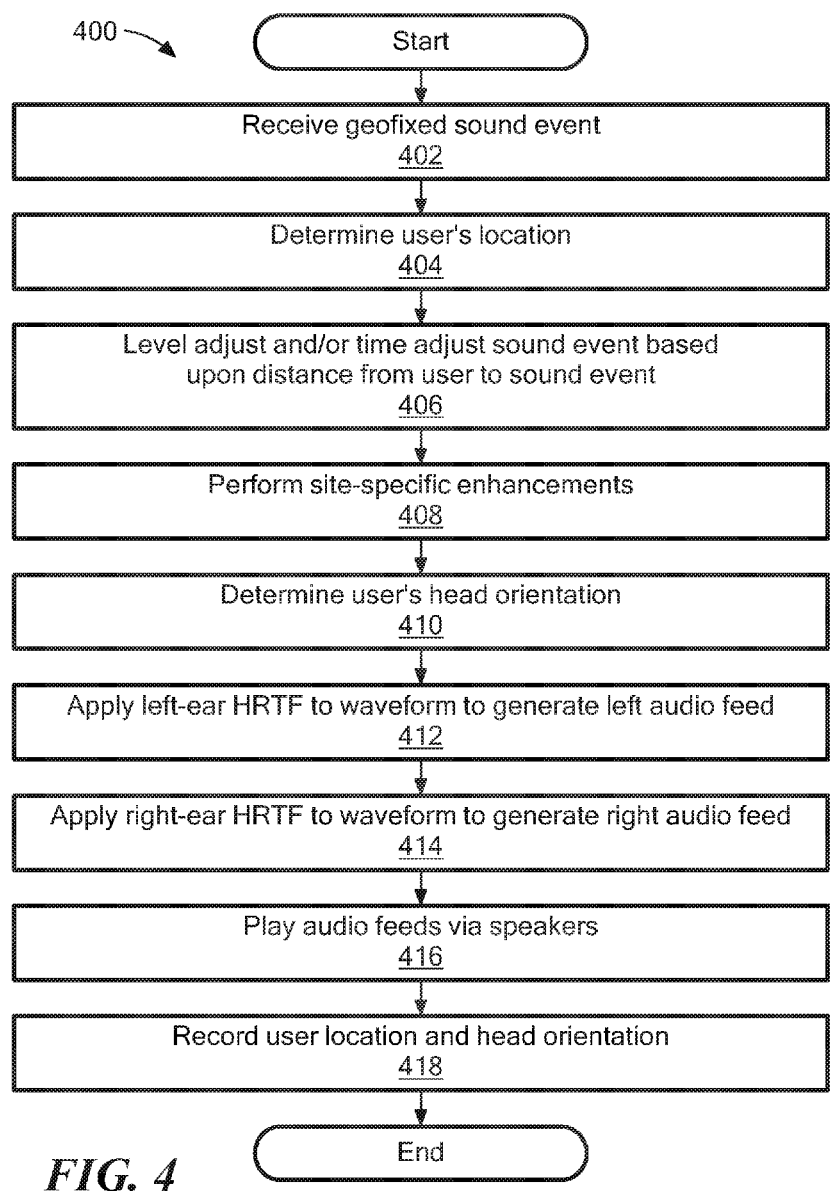
FIG. 4 is a flowchart showing an illustrative method for use in the systems of FIGS. 1, 3A, and/or 3B.

FIG. 4 is a flowchart of a processing technique which may be implemented, for example, within the illustrative central server 302 of FIG. 3A and/or user device 304 of FIG. 3B. Rectangular elements (typified by element 402 in FIG. 4), herein denoted "processing blocks," may represent computer software instructions or groups of instructions. Alternatively, the processing and decision blocks represent processes or operations performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

At block 402, a geofixed sound event is received. The sound event may be received as sound event data comprising a waveform identifier (or actual waveform audio data) and location/timing information. For a stationary sound event, the location/timing information may correspond to a single geographical location and a corresponding time value. For a moving sound event, the location/timing information may correspond to one or more trajectory vectors, as described above with FIG. 3A. In the case where a waveform identifier is received, the sound event processor 304d can retrieve the corresponding waveform from the sound libraries 302h'.

The processing of block 402 may correspond to a user device 304 receiving sound events transmitted from the central server 302 (wherein the central server 302 selects sound events to disseminate using any of the techniques described above). Alternatively, the processing of block 402 may correspond to a user device 304 retrieving a sound event from a local queue of sound events. As another example, the processing of block 402 may correspond to the user device 304 utilizing a locally stored soundscape profile. The received location/timing information may indicate that the sound event should be played immediately or at some time in the future. In some embodiments, the location/timing information is compared against the current time (obtained using the clock 304f) to determine when the sound event should be processed. In some embodiments, the central server 302 and/or user device 304 maintain a time-ordered sequence (e.g., a queue) of sound events and the processing of block 402 includes removing the next-in-time sound event from the sequence.

At block 404, the user's location is determined using the location module 304b (e.g., a GPS module). More particularly, a geolocation associated with the user device is determined. At block 406, the sound event waveform is modified based upon the user's distance from the geofixed sound event. Specifically, the sound event waveform may be level-adjusted (i.e., attenuated or amplified) and/or time-adjusted (i.e., delayed). This may involve modeling sound propagation in free space, water, or other medium.

At block 408, site-specific enhancements may be applied to the sound event waveform. Such site-specific enhancements may include using a preloaded map of abstracted features (e.g. feature maps 302g' of FIG. 3B), such as vegetation density or building exteriors, to perform more accurate real-time modeling of sound attenuation and path of propagation. Functions of acoustic distortion might be directly measured in specific, heavily used locations for high accuracy without computationally intensive modeling, such as the interior of an irregularly shaped, reverberant building. Rainfall and wind might be inferred from acoustic data, and other live sensor readings (e.g., readings from sensors provided within the user device 304 and coupled to the sound event processor 304d) may be incorporated to further enhance modeling of acoustic distortion. It should be understood that such enhancements may be foregone to preserve the flexibility and lack of physical bounds the system provides.

An HRTF is a response function that characterizes or describes (at least in part) how an ear receives sound from a point in space. A pair of HRTFs for two ears can be used to synthesize a binaural sound that seems to come from a particular point in space. These modifications are, in part, dependent upon the shape of the listener's outer ear, head, and body, in addition to the orientation of the listener's head. Separate HRTFs for left and right ears describe the filtering of a sound source before it is perceived at the respective ear.

At block 410, the user's head orientation is determined using the head orientation module 304c (e.g., a magnetometer). At block 412, a left-ear HRTF is applied to the waveform to generate a left audio feed and, at block 414, a right-ear HRTF is applied to the waveform to generate a right audio feed. The HRTFs may be generated prior to the simulation and stored (or "preloaded") upon the user device. In certain embodiments, the HRTFs can be customized to the user such as through direct measurement of the transfer function. At block 416, the multi-channel audio feed is played through speakers 304e so as to be perceived by the user 306.

In some embodiments, at block 418, the user location and head orientation data may be recorded for replay and analysis. If a central server 302 is used, the processing of block 418 may correspond to a user device 304 transmitting location and/or head orientation data to the central server 302. In turn, the data would be received by the user tracking module 302d and made available to the operator 308 via the interface 302a for tracking and modification of ongoing simulations, or stored for later analysis. Alternatively, the user data may be saved to the user device 304 and recovered after a simulation for analysis. It should be understood that recording and transmission of sensor data may be performed in a continuous manner and/or in parallel with processing blocks 402-416.

The method 400 may be repeated many times for a given simulation. In some embodiments, the method 400 is repeated once per sound event defined within a soundscape profile 302f.

It should be understood that the processing of FIG. 4 may be performed on a user device 304. Alternatively, a portion (or all) of the processing of FIG. 4 could be executed on the central server 302. For example, the central server 302 could use location and head orientation data received from a user device 304 to perform user-specific waveform processing 406, 412, 414 and/or site-specific waveform processing 408, and transmit a final multi-channel audio feed to the user device for playback. In such embodiments, a sound event processor 304d (FIG. 3B) could be provided within the central server 302 (FIG. 3A). The speed and storage capacity of the individual processors, which may be affected by size and cost concerns, as well as transmission latency may determine which configuration is more advantageous for a particular implementation.

Figure 5:
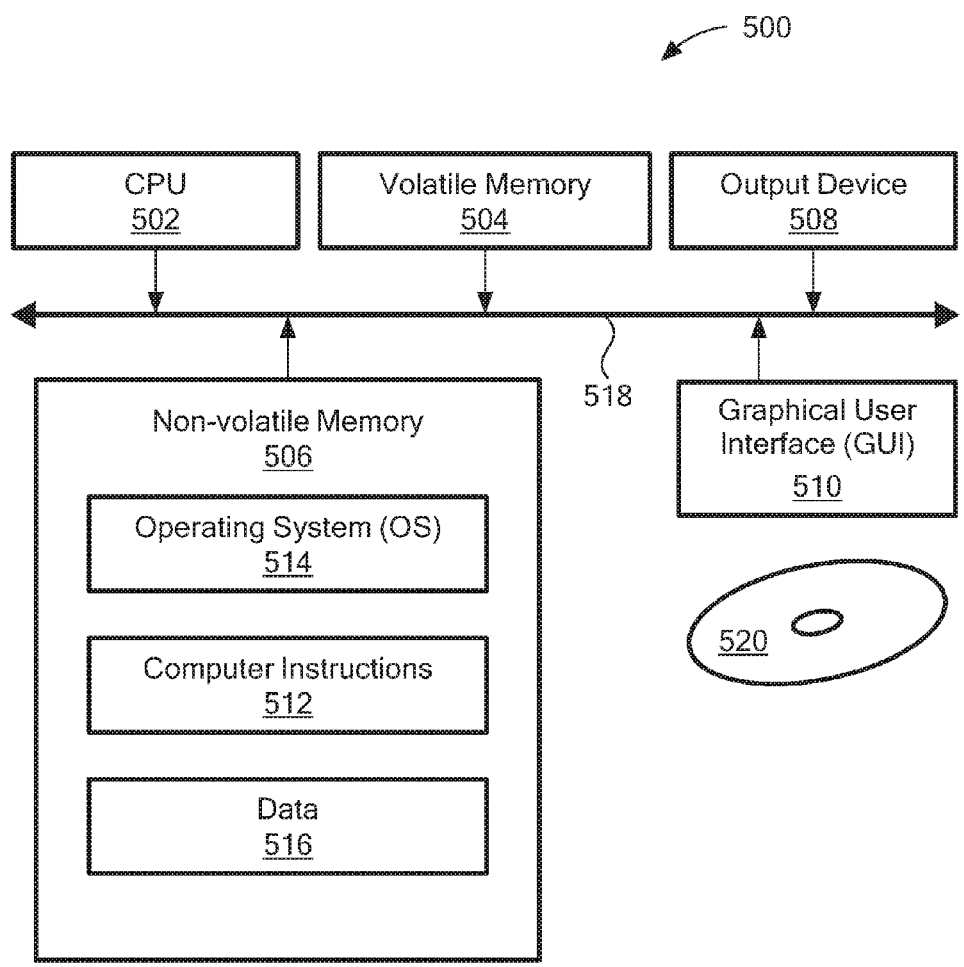
FIG. 5 is a block diagram of an illustrative computer for use with the systems and methods of FIGS. 1, 3A, 3B, and/or 4.

FIG. 5 shows an illustrative computer or other processing device 500 that can perform at least part of the processing described herein. For example, the illustrative central server 302 of FIG. 3A and/or user device 304 of FIG. 3B may comprise (or form a part of) the processing device 500. The illustrative computer 500 includes a processor 502, a volatile memory 504, a non-volatile memory 506 (e.g., hard disk), an output device 508 and a user interface 510, which could include a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

It should be appreciated that the disclosure provides systems and methods for soundscapes fixed to real-world geolocations. The soundscapes can be hosted and disseminated by a central server, and dynamically modified in real-time. The systems and techniques are compatible with commercial offerings, such as VR headsets. The disclosure has gaming and training applications that may be of interest to the military and entertainment industries, for example.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that that scope of protection sought herein should not be limited to the described embodiments but rather should be limited only by the spirit and scope of the following claims.

What is claimed is:

1. A system for multiuser, geofixed acoustic simulations within a real-world geographic region, the system comprising: a central server including:
   a memory configured to store a soundscape profile defining a plurality of sound events which are associated with the real-world geographic region, each of the plurality of sound events having an associated waveform, location/timing information, and trigger criteria;
   a soundscape controller operatively coupled to the soundscape profile and configured to select ones of the plurality of sound events based upon the trigger criteria; and
   a wireless transmitter operatively coupled to the soundscape controller to transmit information about selected sound events; and
   a plurality of user devices, each of the user devices including:
      a head orientation module configured to provide information about the orientation of a user's head;
      a wireless receiver configured to receive information about sound events transmitted from the central server; and
      a sound event processor operatively coupled to the head orientation module and configured to:
         receive, using the wireless receiver, a waveform and a geographic location associated with a sound event;
         level-adjust the waveform based upon a distance between a geographic location associated with the device and the geographic location associated with the sound event;
         apply a left-ear head-related transfer function (HRTF) to the received waveform to generate a left audio feed; and
         apply a right-ear HRTF to the received waveform to generate a right audio feed.

2. The system of claim 1 wherein at least one of the user devices further includes a plurality of speakers operatively coupled to receive audio feeds from the sound event processor.

3. The system of claim 1 wherein at least one of the user devices further includes a location module operatively coupled to the sound event processor and configured to provide a geographic location associated with the at least one user device.

4. The system of claim 1 wherein the sound event processor of at least one of the user devices is further configured to time-adjust a waveform associated with a sound event based upon a distance between a geographic location associated with the at least one user device and a geographic location associated with the sound event.

5. The system of claim 1 wherein at least one of the user devices further includes a memory, wherein the sound event processor of the at least one user device is further configured to record a geographic location associated with the at least one user device and/or head orientation information.

6. The system of claim 1 wherein the central server further comprises an interface to enable an operator to build a soundscape profile.

7. The system of claim 6 wherein the interface comprises a digital map tool to enable the operator to associate ones of a plurality of sound events with corresponding geographic locations.

8. The system of claim 6 wherein the central server memory is further configured to store sound libraries, wherein the interface comprises a browser to enable the operator to select waveforms from the sound libraries to associate with ones of a plurality of sound events.

9. The system of claim 6 wherein the interface enables the operator to associate timing information to ones of a plurality of sound events.

10. The system of claim 6 wherein the interface enables the operator to associate trigger criteria to ones of a plurality of sound events.

11. The system of claim 1 wherein central server comprises a wireless receiver and a user tracking module, wherein the user tracking module is configured to receive geographic locations associated with ones of the plurality of user devices using the wireless receiver.

12. The system of claim 1 wherein at least one of the user devices further includes a memory configured to store feature maps, wherein the sound event processor of the at least one user device is further configured to adjust the waveform based upon information within the feature maps.

13. A method comprising:
   providing a soundscape profile defining a plurality of sound events which are associated with a real-world geographic region, each of the sound events having an associated waveform and geographic location;
   receiving a waveform and a geographic location associated with a sound event;
   obtaining information about the orientation of a user's head;
   obtaining a geographic location associated with the user;
   level-adjusting and time-delaying the waveform based upon a distance between the geographic location associated with the user and the geographic location associated with the sound event;
   applying a left-ear heard-related transfer function (HRTF) to the waveform to generate a left audio feed; and
   applying a right HRTF to the waveform to generate a right-ear audio feed.

\* \* \* \* \*